`US005828959A`

United States Patent [19]
Söderbacka

[11] Patent Number: 5,828,959
[45] Date of Patent: Oct. 27, 1998

[54] TELECOMMUNICATIONS NETWORK

[75] Inventor: Lauri Söderbacka, Espoo, Finland

[73] Assignee: Nokia Telecommunications Oy, Espoo, Finland

[21] Appl. No.: 596,212
[22] PCT Filed: Sep. 28, 1994
[86] PCT No.: PCT/FI94/00437
§ 371 Date: Feb. 15, 1996
§ 102(e) Date: Feb. 15, 1996
[87] PCT Pub. No.: WO95/09514
PCT Pub. Date: Apr. 6, 1995

[30] Foreign Application Priority Data

Sep. 28, 1993 [FI] Finland ................................. 934259

[51] Int. Cl.⁶ ............................................. H04Q 7/24
[52] U.S. Cl. ...................... 455/445; 455/432; 455/433; 455/445; 455/422
[58] Field of Search ................... 455/433, 432, 455/445, 435, 422, 207, 230, 67

[56] References Cited

U.S. PATENT DOCUMENTS

| | | | |
|---|---|---|---|
| 5,054,110 | 10/1991 | Comroe et al. | |
| 5,247,571 | 9/1993 | Kay et al. | 379/230 |
| 5,260,987 | 11/1993 | Mauger | 455/433 |
| 5,307,400 | 4/1994 | Sayer et al. | 455/445 |
| 5,467,381 | 11/1995 | Peltonen et al. | 455/433 |
| 5,479,481 | 12/1995 | Koivunen | 455/422 |
| 5,504,804 | 4/1996 | Widmark et al. | 455/445 |
| 5,561,840 | 10/1996 | Alvesalo et al. | 455/433 |
| 5,566,235 | 10/1996 | Hetz | 379/207 |
| 5,664,005 | 9/1997 | Emery et al. | 455/445 |
| 5,703,942 | 4/1996 | Pinard et al. | 379/207 |

FOREIGN PATENT DOCUMENTS

| | | |
|---|---|---|
| 0454647 A2 | 4/1991 | European Pat. Off. . |
| 0605120 A1 | 6/1993 | European Pat. Off. . |
| 90182 | 9/1993 | Finland . |

OTHER PUBLICATIONS

Patent Abstract of Japan JP 4–239290, Routing System for Mobile Communications System, Aug., 1992.

Primary Examiner—Dwayne D. Bost
Assistant Examiner—Jean A. Gelin
Attorney, Agent, or Firm—IP Group of Pillsbury Madison & Sutro LLP

[57] ABSTRACT

In a telecommunications network having some high mobility subscribers, for which no most likely access point can be determined and the subscriber numbers of which do not include immediate information of the actual location of a subscriber, there are also some semi-fixed subscribers and/or fixed subscribers, for which it is possible to determine their most likely access point and the subscriber numbers of which indicate their most likely access point. In case of incoming calls, the first exchange to process a call in the telecommunications network routes the call on the basis of the called subscriber's subscriber number directly to an exchange serving the subscriber's most likely access point.

16 Claims, 4 Drawing Sheets

TELECOMMUNICATIONS NETWORK

This application claims benefit of international application PCT/FI 94/00437 filed Sep. 28, 1994.

FIELD OF THE INVENTION

The invention relates to a telecommunications network comprising exchanges, subscriber stations, at least part of them capable of moving in the network, as well as at least one subscriber data base for maintaining location information of subscribers.

BACKGROUND OF THE INVENTION

At present, various kinds of developed cellular radio networks are in use and under development, in which a geographical area covered by a network is divided into smaller separate radio coverage areas, i.e. cells, in such a way that, when being in a cell, a radio station communicates with a fixed network via a fixed radio station located in the cell. Radio stations belonging to a system may move freely within the area of the system from one cell into another. One such system is a digital mobile telephone system GSM. When a subscriber, being in the same system or in an external system, wishes to call to a Mobile Station (MS) of such a system, the cellular radio network must know the actual location of the MS in order to be able to route the call. A number dialled by a calling subscriber does not contain any information as to the actual location of the called MS. In other words, numbering in developed mobile telephone networks (e.g. in a GSM system) does not depend on a physical access point. In the present mobile telephone networks, there are no fixed access points, but only traffic channels in public use, which channels are used by mobile subscriber stations. A connection established is always based on the use of identity. In a fixed telephone network (PSTN), all numbers (except new Personal Numbers and UPT numbers) indicate a certain fixed physical extension and a routing takes place directly on the basis of "the address number" of the subscriber. On the other hand, for establishing a connection in a cellular radio network, it is necessary to find out the location of the MS and the routing address required for the call. The cellular network typically knows the location of the MS with an accuracy of a larger area formed by several cells, which area is generally called location area. When moving into a new location area, the MS is registered as a visiting subscriber with a subscriber register of the respective location area, i.e. with a so-called visitor location register, and a so-called roaming number is assigned for the MS. Simultaneously, the MS and the associated information are removed from the visitor location register of a respective departed location area. In general, the cellular network additionally comprises at least one centralized data base, i.e. a so-called home location register, in which the information of the subscriber is stored permanently. When a new subscriber is registered with a visitor location register, information concerning the subscriber is requested from the home location register and the location information of the subscriber is simultaneously updated in the home location register. There is generally a visitor location register in association with each of the mobile telephone exchanges, and each visitor location register may serve several location areas. The basic structure and basic functions of the GSM system are well-known by persons skilled in the art and are defined in the GSM standard issued by the European Telecommunications Standards Institute (ETSI).

In an analog NMT system, all subscribers have a home exchange, to which all mobile-terminating calls are routed. When a subscriber leaves the area of the home exchange and roams into the area of another exchange in the cellular radio network, the subscriber register in the new exchange informs the home exchange of the roaming number of the subscriber, this number indicating the current location of the subscriber. In case of mobile subscribers of high mobility, network capacity is wasted by this method: it would be most economical that the first exchange of the cellular radio network to process a call would interrogate the home location register of the subscriber for the roaming number of the subscriber and the call would be routed on the basis of the roaming number. In the GSM system, the subscriber number indicates the home location register of the subscriber. The home location register asks the visitor location register in the area of which the subscriber is located at the moment for the roaming number of the subscriber. The visitor location register sends the roaming number to the home location register, which forwards the roaming number to the interrogating exchange. On the other hand, in case of calls to mobile subscribers of lower mobility, signalling capacity of the network is wasted by the procedure according to the GSM system.

In present cellular radio networks, incoming calls of all subscribers are processed in the same way regardless of the respective subscribers mobility. Signalling capacity of a cellular radio network is then wasted, if the cellular radio network comprises both subscribers the most likely access point of which can be determined and subscribers the most likely access point of which cannot be determined. Network components will be loaded unnecessarily and the risk of overloading and blocking of the system will increase.

SUMMARY OF THE INVENTION

An object of the invention is to provide a telecommunications network in which the above described drawback of the known networks is alleviated or entirely eliminated.

This is achieved by means of a telecommunications network of the type described in the first paragraph of this specification, which network is according to the invention characterized in that:

the telecommunications network additionally comprises subscriber numbers directly indicating the point of the network to which a call will be routed, without an interrogation to said at least one subscriber data base, the exchanges of the telecommunications network analyze the subscriber number related to an incoming call and, on the basis of the analysis, either route the call directly to the point of the network indicated by the subscriber number or make an interrogation to a data base.

In the invention, incoming calls to subscribers having a most likely access point (a low mobility) are processed in a different manner in comparison with the processing of incoming calls to subscribers not having a most likely access point (because of having a high mobility). The calls addressed to a subscriber having a most likely access point are routed directly to the respective most likely access point of the subscriber instead of making register interrogations. As to the calls coming to a subscriber not having a most likely access point, register interrogations are made at first, and subsequently, the call is routed to the subscriber on the basis of the roaming number of the subscriber.

In the telecommunications network according to the invention, the subscribers are distinguished from each other on the basis of information included in the subscriber numbers. The subscriber numbers of the subscribers having a high mobility do not contain any immediate information of as to the actual location of the respective subscriber, and no indication of any predetermined access point in the network, and require an interrogation to subscriber data bases before a call can be routed forward. The subscribers having a low mobility have subscriber numbers indicating permanently a predetermined access point of the respective network, due to which a call can be routed directly to the respective access point indicated by the respective subscriber number.

Subscriber numbers indicating directly the access point of the network for routing a call may comprise at least one of the following types of subscriber numbers: a fixed subscriber number for a subscriber who is considered to be located permanently at the access point indicated by the respective fixed subscriber number and a semi-fixed subscriber number for a subscriber who is considered to be located mainly at the access point indicated by the respective subscriber number, but capable of moving also elsewhere in the network.

In the invention, the location information, as well as other subscriber data regarding each high mobility and semi-fixed subscriber, are stored in a subscriber data base of the telecommunications network. The location etc., information of fixed subscribers need not absolutely be stored in any data base. As to data base interrogations, the difference between a semi-fixed and a fixed subscriber consists in that an exchange serving the most likely access point of the semi-fixed subscriber may at times have to search for the routing data of the semi-fixed subscriber in the data base of the semi-fixed subscriber, while a home exchange serving the most likely access point of a fixed subscriber never has to search for a roaming number in case of incoming calls to the fixed subscriber, because the fixed subscriber never moves from its most likely access point to another point in the telecommunications network. In this application, the access point has to be understood in a very wide sense. The access point may be, for instance, a predetermined wired subscriber line or a private branch exchange or some other subsystem connected to the telecommunications network. Further, the access point may be e.g., a predetermined base station, paging area or location area. Then, the access point is not a predetermined wired subscriber line, but a radio channel or a group of radio channels available in a predetermined geographical area. Also, a voice mail box implemented in the network and storing messages coming to the subscriber may serve as an access point.

All calls are at first processed in an exchange, which is the first to receive the incoming call in a telecommunications network. Hereinafter, this exchange is called a routing exchange. This exchange may be any exchange of the telecommunications network or any gateway exchange between the telecommunications network and any other network. Subscribers of different types will be recognized in the routing exchange. In case of an incoming call, the routing exchange analyzes the subscriber number of the called subscriber and identifies the type of the called subscriber on the basis of the analyzed subscriber number. In case of a call to a subscriber having a high mobility, the routing exchange identifies the home data base of the called subscriber on the basis of the subscriber number and interrogates the home data base for routing information. The data base sends the routing address of the subscriber to the routing exchange, which routes the call to the routing address. In case of a call to a semi-fixed or fixed subscriber, the routing exchange identifies the exchange serving the most likely access point of the called subscriber on the basis of the subscriber number. The routing exchange does not make any interrogation of the home data base of the subscriber, but routes the call directly to the most likely access point of the called subscriber (or at least to the exchange serving the most likely access point of the subscriber). If the called semi-fixed subscriber is not at its most likely access point, either the routing exchange or the exchange serving the most likely access print interrogates routing information from the home data base of the subscriber, the home location register, which is identified by the interrogating exchange on the basis of predetermined parts of the subscriber number, for instance. Upon receipt of the routing address, the routing exchange routes the call to the exchange serving the current location area of the called subscriber.

BRIEF DESCRIPTION OF THE DRAWINGS

The invention will be described in more detail by means of illustrative embodiments referring to the attached drawings, in which.

DETAILED DESCRIPTION OF THE PREFERRED EMBODIMENTS OF THE INVENTION

Accordingly, the invention will be explained in the following by using as an example a GSM cellular radio network, to which is connected a subsystem, which in this example is a cordless private branch exchange. However, the invention may also be applied to other cellular radio networks and systems. The invention may further be applied to wired telecommunications networks, such as telephone networks, in which the subscribers may move and the mobility is under control. In this example, the most likely access point of a subscriber of the subsystem to the cellular radio network is located in its subsystem, e.g. in the private branch exchange. The subsystem of the example comprises both wired and cordless extensions. Users of the wired extensions are fixed subscribers of the cellular radio network, as described above. On the other hand, users of the cordless extensions of the private branch exchange are divided into fixed or semi-fixed subscribers of the cellular radio network, as described above. A user of a cordless extension of the private branch exchange, capable of moving within the area of the subsystem only, is a fixed subscriber of the cellular radio network. A user of a cordless extension of the private branch exchange, capable of moving, except in its own subsystem, also in some other subsystems connected to the cellular radio network and possibly also in the primary cellular radio network itself, is a semi-fixed subscriber of the cellular radio network. The high mobility subscribers with which the invention is concerned are in this example subscribers of the cellular radio network, possibly capable of being registered also with an extension of the subsystem and using the services of the cellular radio network in that extension.

Figure 1:
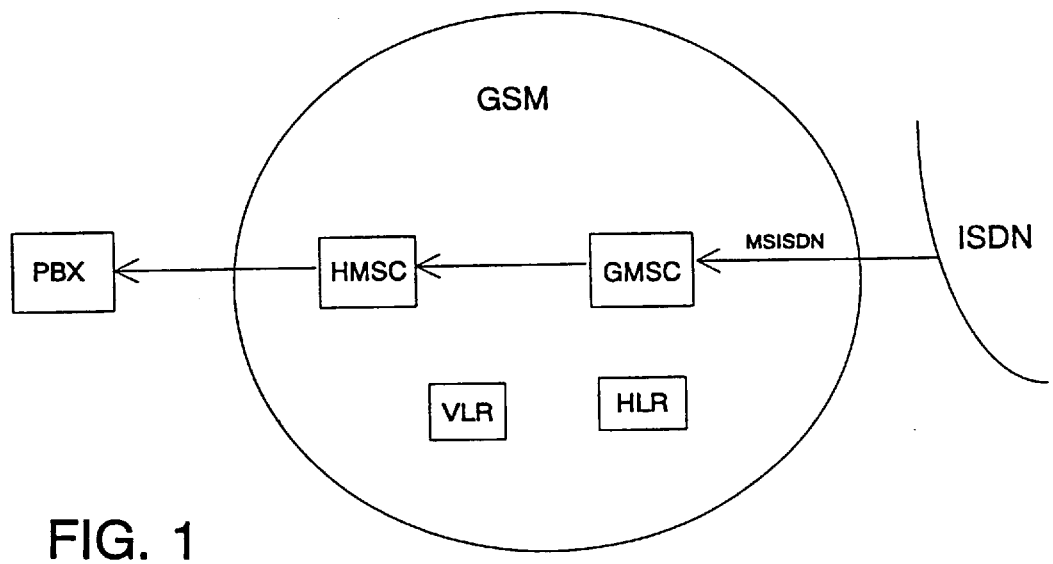
FIG. 1 illustrates a routing of a call from an ISDN to a semi-fixed or fixed subscriber of a cellular radio network, when the called subscriber is at its most likely access point (PBX)

FIG. 1 illustrates a routing of a call from an ISDN to a semi-fixed or fixed subscriber of a cellular radio network, when the called subscriber is at its most likely access point. In this example, the most likely access point of the called subscriber is a cordless subsystem PBX or its extension connected to the cellular radio network. The ISDN routes the call to the cellular radio network GSM, in which the call is processed initially in an exchange Gateway Mobile Services Switching Center GMSC. The GMSC performs an analysis of the subscriber number and routes the call on the basis of the subscriber number analysis directly to that exchange HMSC of the cellular radio network which serves the most likely access point of the semi-fixed or fixed subscriber. Accordingly, the GMSC does not make an interrogation to a Home Location Register HLR of the subscriber for a roaming number for the called subscriber. It shall be noted that the GMSC does not in this connection absolutely signify a gateway exchange of the GSM network (Gateway Mobile Services Switching Centre, GMSC), meaning expressly a gateway exchange between a fixed telephone network PSTN/ISDN and a GSM network and being the first exchange of the cellular radio network to process the calls coming from the PSTN/ISDN. However, in case of calls from the cellular radio network, the first exchange to process a call is not absolutely the gateway exchange between the PSTN/ISDN and the cellular radio network, but it may be any exchange of the cellular radio network. In case of calls from another network, the first exchange to process a call, making e.g. a data base interrogation, may also be an exchange of this other network. In this connection, the abbreviation GMSC is thus used in a wider sense than in the GSM network.

Three different solutions are set forth to distinguish the subscribers. In two solutions, the numbers of the high mobility subscribers and the semi-fixed/fixed subscribers have different formats from one another and in one solution they all have identical formats. These solutions will be described later in this specification.

The numbering to be used in the cellular radio network according to the invention is examined in the following. An MSISDN number used in a GSM network consists of three sections: CC NDC SN, in which CC=Country Code (length 1 to 3 digits), NDC=National Destination Code (no definite length) and SN=Subscriber Number (no definite length). The maximum length of the MSISDN number is 12 digits at Sep. 28, 1993, but the maximum length grows to 15 digits by Jan. 1, 1997. The semi-fixed and fixed subscriber numbers of the cellular radio network according to the invention differ from the MSISDN numbers, as far as their format is concerned. The format of the subscriber number of a high mobility subscriber differs or does not differ from the format of the MSISDN number, depending on the numbering scheme selected. In the following, two solutions for numbering the subscribers of the cellular radio network according to the invention will be examined. With an increasing maximum length of the number, the lengths of the separate sections of the number can be increased from the lengths to be presented below as an example.

The first way of implementing numbering of the subscribers of the cellular radio network according to the invention is by using a so-called MSC/HLR numbering. In MSC/HLR numbering, the numbers of the high mobility, semi-fixed and fixed subscribers have an identical format. The format of an MSC/HLR number is as follows: CC NDC MH EN, in which CC=Country Code, NDC=National Destination Code (no definite length), MH=identifier of an exchange serving the most likely access point of a semi-fixed or fixed subscriber or identifier of a home location register serving a high mobility subscriber (e.g., 2 digits), EN=subscriber-specific number (e.g., 5 digits). An MSC/HLR number could look like this, for instance: 358 50 55 12345. In the MSC/HLR number of a high mobility subscriber, the MH identifies the home location register of the subscriber. In the MSC/HLR number of a semi-fixed and fixed subscriber, the MH identifies the exchange serving the most likely access point of the subscriber. In case of a call to a subscriber having an MSC/HLR number, the first exchange GMSC to process the call in the cellular radio network analyzes the MH from the called subscriber number, if the MH identifies a home location register HLR of the cellular radio network, the GMSC routes the call to the HLR identified by the MH, and, if the MH identifies an exchange HMSC of the cellular radio network, the GMSC routes the call directly to the HMSC. The MSC/HLR numbering divides a number space of the cellular radio network into sections.

The second way of implementing a numbering of the subscribers of the cellular radio network according to the invention is a so-called prefix+exchange numbering. In the prefix+exchange numbering, differing from the MSC/HLR numbering, the format of the subscriber number of a high mobility subscriber is different from that of the subscriber number of a semi-fixed or fixed subscriber. In the prefix+exchange numbering, a high mobility subscriber uses an MSISDN number described above and the format of a fixed subscriber number is as follows: CC NDC PFX M EN, in which CC=Country Code, NDC=National Destination Code, PFX=identifier of semi-fixed and fixed subscriber numbers, M=number of an exchange serving the most likely access point of the subscriber, EN=subscriber-specific number. The first section PFX of the subscriber number separates the numbers of the semi-fixed and fixed subscribers from the other numbers of the cellular radio network. Accordingly, the part of the number space of the cellular radio network beginning with the identifier PFX is reserved only for semi-fixed and fixed subscriber numbers. In case of a call to a subscriber having a prefix+exchange number, the first exchange (GMSC) to process the call in the cellular radio network detects on the basis of the identifier PFX that the called subscriber number is a semi-fixed or fixed subscriber number and the GMSC routes the call on the basis of the exchange number M in the subscriber number to an exchange HMSC serving the access point indicated by the subscriber number, which routes the call to the called subscriber on the basis of the EN.

The third way of implementing a numbering of the subscribers of the cellular radio network according to the invention is a so-called prefix numbering which is, especially suitable for numbering subsystems to be connected to the cellular radio network. As in the prefix+exchange numbering, the format of the subscriber number of a high mobility subscriber is also in the prefix numbering different from that of the subscriber number of a semi-fixed or fixed subscriber. A high mobility subscriber uses an MSISDN number described above and a semi-fixed and fixed subscriber use a prefix number having the following format: CC NDC PFX SS EN, in which CC=Country Code, NDC= National Destination Code (no definite length), PFX= identifier of a semi-fixed and fixed subscriber number (e.g. 1 digit), SS=number of subsystem connected to the cellular radio network and containing the most likely access point of the subscriber (e.g. 3 digits), EN=subscriber-specific number (e.g. number of an extension of the subsystem) (e.g. 3 digits). A prefix number could look like this, for instance: 358 50 9 555 123. On the basis of the identifier PFX, the first exchange GMSC to process a call in the cellular radio network detects that the number of the called subscriber is a subscriber number of some subsystem. On the basis of the SS, the GMSC detects within the service area of which exchange the respective subsystem is located. The GMSC routes the call to the respective subsystem, which routes the call further to the subscriber. For each call, the GMSC analyzes at least the first two sections of the subscriber number of the called subscriber: in case of a high mobility subscriber number, these two sections indicate to the GMSC which HLR the GMSC shall ask for a roaming number MSRN, and in case of a prefix number, the sections tell that the GMSC has to route indicated call, without making any register interrogations, directly to an exchange HMSC serving the most likely access point of the called subscriber. Each exchange of the cellular radio network according to the invention must be capable of analyzing, in addition to ordinary MSISDN numbers, numbers of semi-fixed and fixed subscribers, because any exchange may have to perform it.

In the presented embodiment, the location information of each high mobility and semi-fixed subscriber and other information concerning the subscriber are stored in the home location register HLR of the cellular radio network, called subscriber home register. It is not absolutely necessary to store location etc., information of fixed subscribers in any HLR. As far as home register interrogations are concerned, the difference between a semi-fixed and a fixed subscriber consists in that the exchange HMSC serving the most likely access point of a semi-fixed subscriber may sometimes have to interrogate the roaming number of the semi-fixed subscriber from the home location register, while in case of calls to a fixed subscriber, the home exchange HMSC serving the most likely access point of the fixed subscriber never has to make any interrogation for a roaming number, because a fixed subscriber never moves from its most likely access point to another point in the cellular radio network. As to the HLR, semi-fixed numbers are valid MSISDN numbers. Also, fixed numbers may be valid MSISDN numbers, as far as the HLR is concerned.

Figure 2:
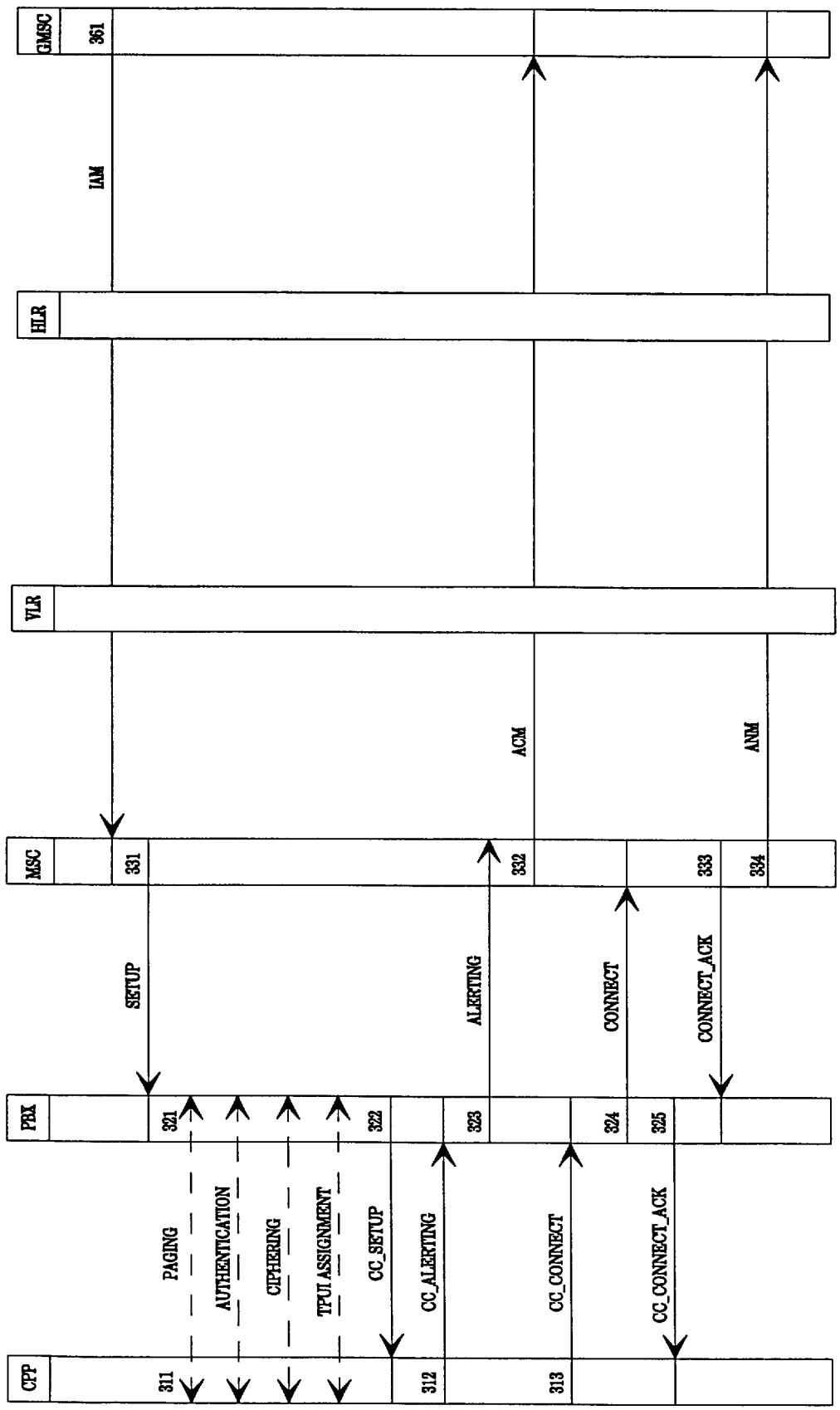
FIG. 2 illustrates a signalling relating to a call to a semi-fixed or fixed subscriber to an extension of a cordless subsystem (PBX) connected to the cellular radio network, when the called subscriber is at the extension.

FIG. 2 illustrates signalling in a cellular radio network, relating to a call to a semi-fixed or fixed subscriber to an extension of a cordless subsystem PBX connected to the cellular radio network, when the called subscriber is located at the extension. Vertical beams depict network elements of the cellular radio network, the subsystem PBX connected to the cellular radio network and the cordless extension CPP of the subsystem connected to the cellular radio network. When a semi-fixed subscriber is called, no register interrogations are made and the first exchange GMSC to process the call in the cellular radio network adds to an IAM (e.g. user-to-user information or another information field) going to an exchange HMSC serving the most likely access point of the called subscriber, information that the HMSC has to use only ISDN information for a call setup. The exchanges of the cellular radio network shall be modified to understand this information, because it has not been defined originally in the IAM or elsewhere in the cellular radio network. It is not necessary to include information as to using ISDN signalling in the IAM, but the information may be included in the subscriber number. The HMSC then makes decisions independently on the basis of the called subscriber number. The HMSC thus continues setting up the call to the subsystem by ISDN signalling (=setup message) and the subsystem routes the call finally to the called subscriber on the basis of its extension number. Subscriber paging, subscriber authentication, ciphering and allocation of temporary subscriber identity are performed in this example within the subsystem, the cellular radio network not participating therein in any way. This also reduces the signalling load related to call setup.

Figure 3:
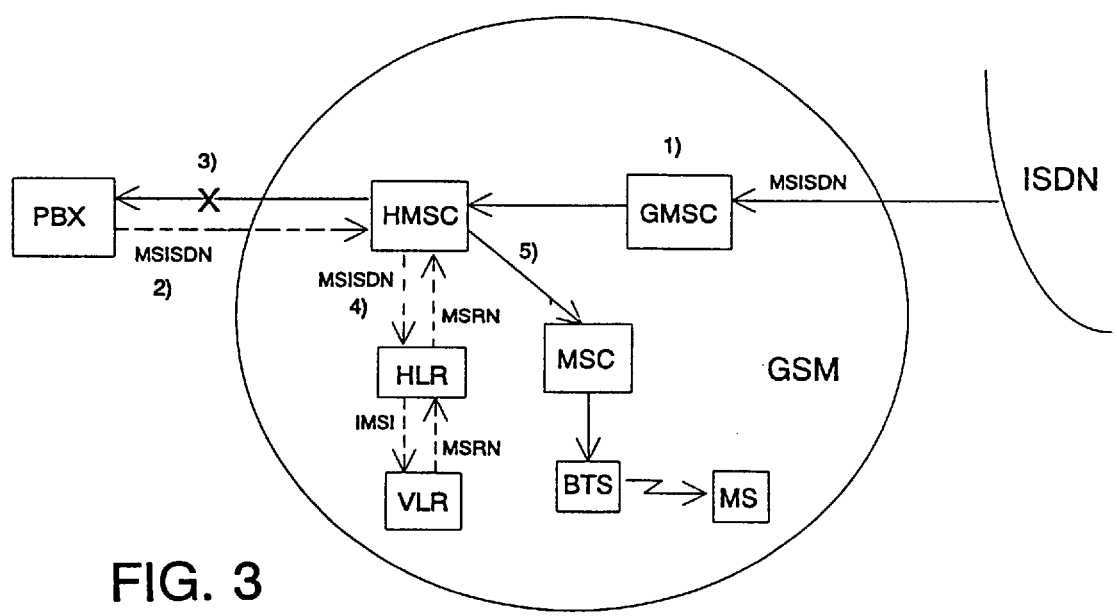
FIG. 3 illustrates a routing of a call from the ISDN to a semi-fixed subscriber of the subsystem (PBX), when the called semi-fixed subscriber (MS) has roamed outside the subsystem (PBX) into the area of a base station (BTS) belonging to the service area of an exchange (MSC) of the cellular radio network.

FIG. 3 illustrates signalling in a cellular radio network, relating to a call from an ISDN to a semi-fixed or fixed subscriber to an extension of a cordless subsystem PBX connected to the cellular radio network, when the called subscriber has left its most likely access point in the subsystem and made a location updating in the cellular radio network in a Visitor Location Register VLR serving the service area of an exchange MSC. The ISDN routes the call to the cellular radio network GSM, in which the call is initially processed in an exchange GMSC. The GMSC performs an analysis of the subscriber number (1) and routes the call on the basis of the subscriber number analysis directly to that exchange HMSC of the cellular radio network which serves the most likely access point of the semi-fixed or fixed subscriber. The HMSC routes the call directly to the most likely access point of the called subscriber on the basis of the subscriber number and the routing information contained in its routing table. Since the called subscriber is not at its most likely access point and the subscriber has made a location updating in the cellular radio network, the call is routed from the most likely access point of the subscriber back to the HMSC (2) by using a predetermined signalling message intended for this purpose. The HMSC knows on the basis of the used message and its transmitter that it has to release the connection between the subsystem PBX and the HMSC (3) and to make an interrogation to the HLR for the roaming number (4). Further, the HLR requests the VLR serving the current location area of the subscriber to send the roaming number MSRN on the basis of a subscriber identity IMSI of the subscriber. The VLR sends the MSRN to the HLR, which forwards the MSRN to the HMSC. The HMSC routes the call on the basis of the received MSRN to an exchange MSC (5) serving the current location area of the subscriber and routing the call further to the subscriber MS.

When a call is routed from the subsystem PBX to the HMSC, the PBX needs to send only the called subscriber number to the HMSC, because the HMSC has already generated a call-specific data record from the call earlier, which record has been identified by the HMSC by means of the called subscriber number. So, the HMSC is capable of releasing the connection to the most likely access point of the subscriber on the basis of the called subscriber number and the information contained in the call-specific data record. The connection between the HMSC and the most likely access point of the called subscriber may also be maintained. Information as to of the location updating made by the subscriber in the cellular radio network may be transmitted to the most likely access point of the subscriber for instance as follows. When the subscriber makes its first location updating in the cellular radio network after having left its most likely access point, the subscriber HLR sends a location cancellation message to the visitor location register serving the most likely access point of the subscriber. The visitor location register serving the most likely access point of the subscriber sends information as to of the location cancellation to that exchange to which the visitor location register is connected, e.g. along an information path common to the exchange and the visitor location register and that exchange sends the same information to the most likely access point of the subscriber, e.g. by using a User Signalling Bearer Service message of DSS.1 subscriber signalling in a manner predetermined for this particular purpose. Accordingly, there exists information as to location updating made by the semi-fixed subscriber in the cellular radio network at the most likely access point of the subscriber and a call to the subscriber can be routed from the most likely access point of the subscriber back to the HMSC serving the most likely access point of the subscriber and routing the call further by means of the subscriber roaming number. In this case, information as to of a removal of the subscriber from its most likely access point is stored primarily at this likely access point.

Figure 4:
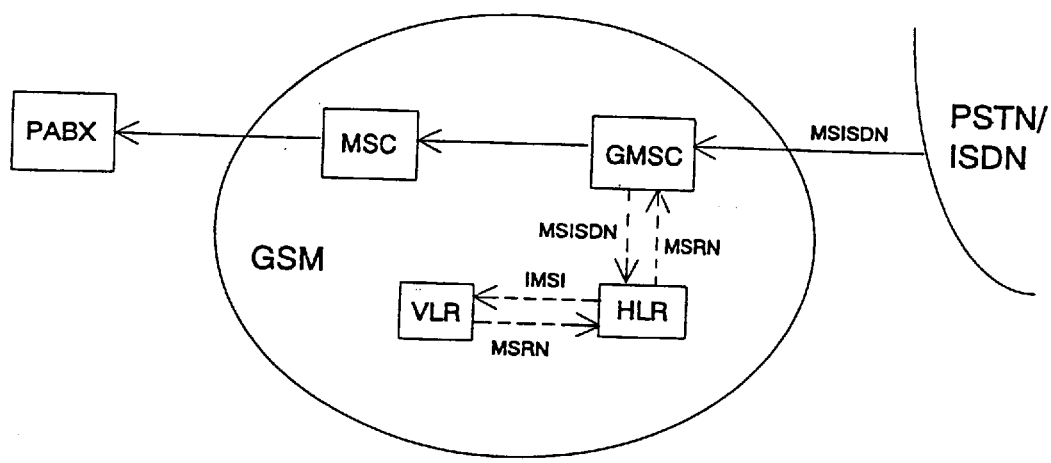
FIG. 4 illustrates a routing of a call from the ISDN to a high mobility subscriber of the cellular radio network, when the subscriber has roamed to the subsystem (PBX) connected to the cellular network.

FIG. 4 illustrates a routing of a call from an ISDN to a high mobility subscriber of a cellular radio network, the high mobility subscriber having roamed into a subsystem connected to the cellular radio network and using through a cordless extension of the subsystem the services of the cellular radio network by means of its subscriber identity in the cellular radio network. The ISDN routes the call to the first exchange GMSC to process the call in the cellular network. The GMSC identifies the HLR of the subscriber on the basis of the first digits of the subscriber number and makes an interrogation to the subscriber HLR for the roaming number MSRN. The HLR requests the VLR serving the current location area of the subscriber to send the MSRN. The VLR sends the roaming number to the HLR, which forwards the MSRN to the GMSC. The GMSC then routes the call on the basis of the MSRN to the subscriber.

Figure 5:
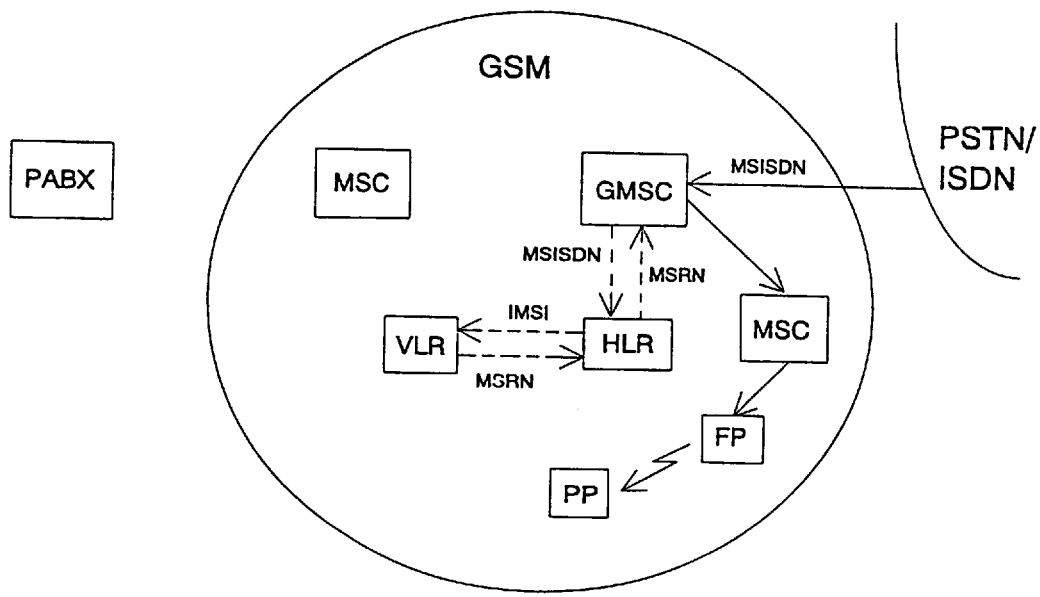
FIG. 5 illustrates a routing of a call from the ISDN to a high mobility subscriber (MS) of the cellular radio network, when the subscriber (MS) is within the area of the cellular radio network and not in the subsystem (PBX) connected to the cellular radio network.

FIG. 5 illustrates a routing of a call from an ISDN to a high mobility subscriber of a cellular radio network, when the high mobility subscriber is within the area of the cellular radio network and is not in a subsystem connected to the cellular radio network. The ISDN routes the call from the calling subscriber of the ISDN to the first exchange GMSC to process the call in the cellular network. The GMSC identifies the HLR of the subscriber on the basis of the first digits of the subscriber number and makes an interrogation to the HLR for the roaming number MSRN. The HLR requests the VLR serving the current location area of the subscriber to send the MSRN, on the basis of a subscriber identity IMSI of the subscriber. The VLR sends the roaming number to the HLR, which forwards the MSRN to the GMSC. The GMSC then routes the call to the subscriber on the basis of the MSRN.

The invention as exemplified above may also be modified. In the following, one alternative manner of processing a call coming to a semi-fixed or fixed subscriber will be described. In case of a call to a semi-fixed or fixed subscriber, the first exchange GMSC to process the call in the cellular radio network routes the call to an exchange HMSC serving the most likely access point of the subscriber. Immediate measures of the HMSC now depend on whether the called subscriber is at its most likely access point or not. If the called subscriber is a fixed subscriber, the measures are straightforward: a fixed subscriber is always at its most likely access point, due to which the HMSC routes the call directly to it without any other measures. On the other hand, if the called subscriber is a semi-fixed subscriber, the HMSC checks a particular parameter in the HMSC or in a visitor location register in connection with the HMSC, which parameter indicates whether the semi-fixed subscriber is at its most likely access point or not. The parameter is set by the visitor location register serving the most likely access point of the semi-fixed subscriber. When the semi-fixed subscriber makes the first location updating in the cellular radio network after having left its most likely access point and the visitor location register serving the most likely access point of the semi-fixed subscriber receives a subscriber location cancellation from the home location register of the subscriber, the visitor location register serving the most likely access point of the subscriber sets a parameter to indicate that the subscriber is not at its most likely access point. When the semi-fixed subscriber returns to its most likely access point again and makes a location updating in the visitor location register serving the most likely access point of the subscriber, the visitor location register sets a parameter to indicate that the subscriber is at its most likely access point. And, when a call comes to the semi-fixed subscriber indicated to be at its most likely access point by the parameter indicating the location with an accuracy described above, the HMSC routes the call directly to the most likely access point of the subscriber. On the other hand, if the parameter indicates that the called semi-fixed subscriber is somewhere else than at its most likely access point, the HMSC makes an interrogation to the home location register of the subscriber for the roaming number of the subscriber. The HMSC identifies the home location register of the subscriber, e.g. on the basis of predetermined sections of the subscriber number or on the basis of the VLR data. Upon receipt of the roaming number, the HMSC routes the call to the current location area of the subscriber.

In the following, the above described alternative manner of processing a call coming to a semi-fixed or fixed subscriber is described on the basis of an illustrative embodiment of FIG. 6. As in the previous examples, the calling subscriber is in an ISDN. The first exchange GMSC to process the call in the cellular radio network analyzes the subscriber number of the called subscriber and routes the call on the basis of the number analysis to a cellular radio network exchange HMSC serving the most likely access point of the semi-fixed subscriber. The HMSC does not route the call directly to the most likely access point of the subscriber, but checks the parameter indicating the location of the semi-fixed subscriber. Because the parameter indicates that the subscriber is in the cellular radio network, the HMSC makes an interrogation to the HLR for the subscriber MSRN. On the other hand, the HLR requests the VLR serving the current location area of the subscriber to send the MSRN on the basis of an IMSI of the subscriber in the cellular radio network. The VLR sends the MSRN to the HLR, which forwards the MSRN to the HMSC. The HMSC routes the call on the basis of the received MSRN to an MSC serving the current location area of the subscriber and routing the call further to the subscriber MS.

Figure 7:
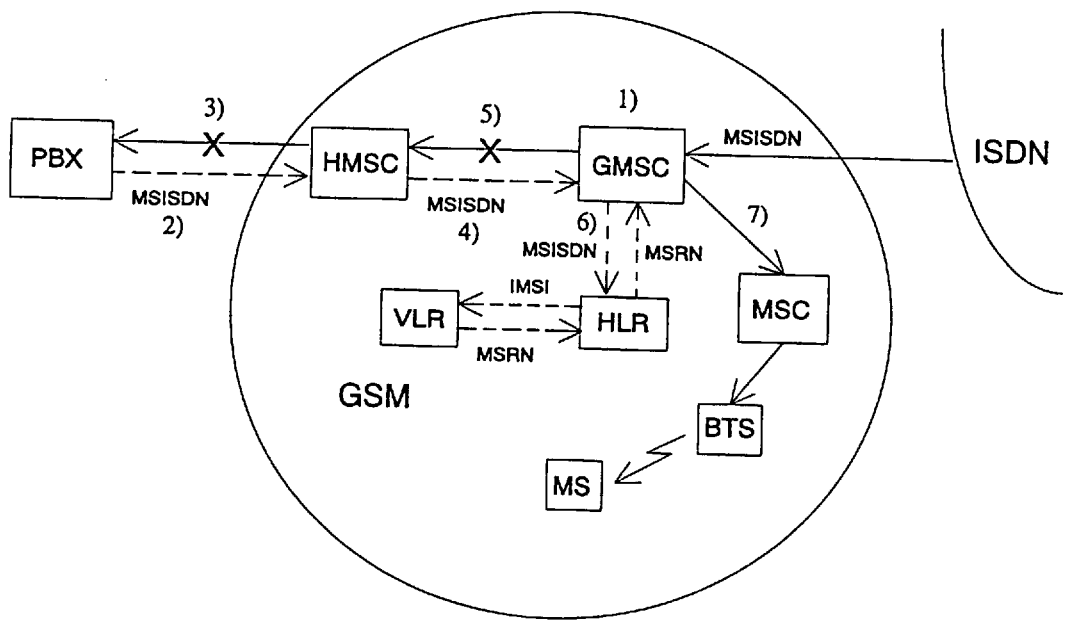

FIG. 7 illustrates a third alternative to route an incoming call to a semi-fixed subscriber having left its most likely access point. The calling subscriber is in an ISDN as in the previous examples. The ISDN routes the call to a cellular radio network GSM, in which the call is initially processed in the exchange GMSC. The GMSC makes a subscriber number analysis (1) and routes the call on the basis of the subscriber number analysis directly to that exchange HMSC of the cellular radio network which serves the most likely access point of a semi-fixed or fixed subscriber. The HMSC routes the call to the most likely access point of the subscriber. Since the subscriber is not there, the call is routed back to the HMSC from the most likely access point of the subscriber (2) and the HMSC releases the connection between the most likely access point of the subscriber and the HMSC (3). The call is routed from the HMSC back to the GMSC (4), which releases the connection between the HMSC and GMSC by means of a release message and a suitable cause code 1(5). If a TUP is used as a signalling method between the exchanges, e.g. a Diversion-Request Message can be used as a release message. No cause code is then needed. On the other hand, if an ISUP is used as a signalling method between the exchanges, a release message provided with the cause code Called User Not Reachable can be used. A connection between the exchanges can also be left unreleased. Upon release of a connection, the GMSC makes an interrogation to the home location register for the roaming number of the called subscriber (6) and routes the call to the current location area of the subscriber on the basis of the roaming number (7).

Figure 6:
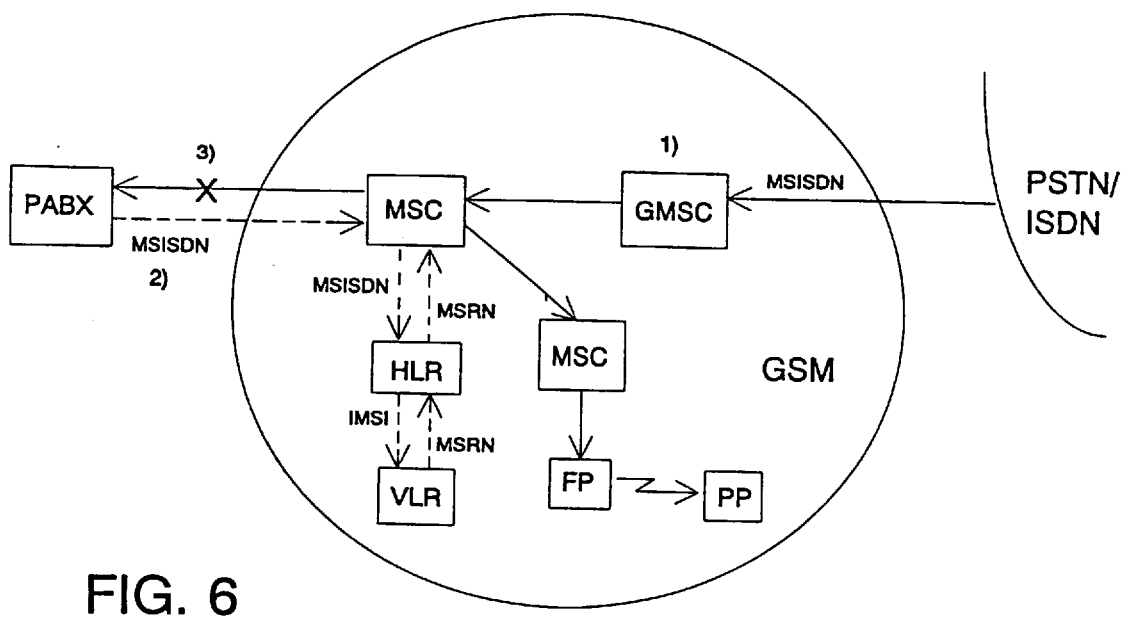
FIG. 6 illustrates a second way of attending to the routing of a call from the ISDN to a semi-fixed subscriber (MS) of the subsystem (PBX), when the called semi-fixed subscriber (MS) has roamed outside the subsystem (PBX) into the area of a base station (BTS) belonging to the service area of an exchange (MSC) of the cellular radio network and, FIG. 7 illustrates a third way of attending to the routing of a call from the ISDN to a semi-fixed subscriber (MS) of the subsystem (PBX), when the called semi-fixed subscriber (MS) has roamed outside the subsystem (PBX) into the area of a base station (BTS) belonging to the service area of an exchange (MSC) of the cellular radio network.

Also in the first-described modification of the invention according to the embodiment illustrated in FIG. 6, the connection between the HMSC and GMSC can be released and, instead of the HMSC, the GMSC can make a home register interrogation.

The figures and the associated specification are only intended to illustrate the invention. As to the details, the telecommunications radio network may vary within the scope and spirit of the claims.

I claim:

1. A telecommunications network, comprising:

exchanges, subscriber stations, at least part of them being capable of moving in the network at least one subscriber data base for maintaining location information of subscribers, a first type of subscriber numbers requiring a routing data interrogation to said at least one subscriber data base for routing an incoming call, a second type of subscriber numbers directly indicating the point of the network to which a call will be routed, without an interrogation to said at least one subscriber data base, the exchanges of the telecommunications network being arranged to analyze the subscriber number related to the incoming call and, on the basis of the analysis, either route the call directly to the point of the network indicated by the subscriber number when the analyzed subscriber number is said second type of subscriber number, or make said routing data interrogation to said at least one data base when said subscriber number is said first type of subscriber number, the subscribers being classified on the basis of mobility into subscribers having a high mobility and subscribers having a low mobility, the subscribers having a high mobility having said first type of subscriber numbers not directly containing any information of the actual location of a subscriber having a number and not indicating any predetermined access point in the network whereby, in case of incoming calls, the first exchange of the telecommunications network processing the call is arranged to make an interrogation to a data base of the called subscriber for routing information and to route the call on the basis of the received routing information to an exchange serving the current access point of the sub-scriber, and the subscribers having a low mobility have said second type of subscriber numbers indicating fixedly a predetermined access point of the network, whereby, in case of calls to a subscriber having said second type of a subscriber number, the first exchange processing the call is arranged not to make any data base interrogation, but to route the call on the basis of the information included in the subscriber number directly to an exchange of the telecommunications network serving the access point indicated by the subscriber number.

2. A telecommunications network according to claim 1, wherein:

said first type of subscriber numbers indicating directly the point of the network to which a call is routed comprise at least one of the following types of subscriber numbers:

a fixed subscriber number for a subscriber which is fixedly at the access point indicated by the subscriber number, and a semi-fixed subscriber number for a subscriber which is mainly at the access point indicated by the subscriber number, but can also move elsewhere in the network.

3. A telecommunications network according to claim 2, wherein:

an exchange of the telecommunications network serving an access point indicated by a subscriber number is arranged to route an incoming call further to the access point indicated by the subscriber number, information as to whether a semi-fixed subscriber is at the access point indicated by the subscriber number is maintained at the access point indicated by the subscriber number, and information as to the location of a subscriber having left the access point indicated by its subscriber number is maintained in the subscriber data bases of the telecommunications network.

4. A telecommunications network according to claim 3, wherein:

if a subscriber is not at an access point indicated by a semi-fixed subscriber number, the call is arranged to be routed back to an exchange of the telecommunications network serving the access point indicated by the subscriber number, which exchange is arranged to make an interrogation to a subscriber data base of the subscriber for routing information of the called subscriber and to route the call on the basis of the received routing information to an exchange serving the current location area of the subscriber.

5. A telecommunications network according to claim 3, wherein:

if a subscriber is not at an access point indicated by a semi-fixed subscriber number, the call is arranged to be routed back to an exchange of the telecommunications network serving the access point indicated by the subscriber number and further back to the exchange having been the first to process the call in the telecommunications network, which exchange is arranged to make an interrogation to a subscriber data base of the subscriber for routing information of the called subscriber and to route the call on the basis of the received routing information to an exchange serving the current location area of the subscriber.

6. A telecommunications network according to claim 2, wherein:

information as to whether a semi-fixed subscriber is at an access point indicated by its subscriber number is maintained in an exchange and/or data bases of the telecommunications network serving the access point indicated by the subscriber number, information as to the location of a subscriber having left an access point indicated by its subscriber number is maintained in the subscriber data bases of the telecommunications network, the exchange serving the access point indicated by the subscriber number is arranged to check whether the subscriber is at the access point, if the subscriber is at the access point indicated by its subscriber number, the exchange of the telecommunications network serving the access point indicated by the subscriber number is arranged to route the call to the access point indicated by the called subscriber number, and if the subscriber is not at the access point indicated by the semi-fixed subscriber number, the exchange serving the access point indicated by the subscriber number is arranged to make an interrogation to the subscriber data base of the subscriber for routing information of the called subscriber and to route the call on the basis of the received routing information to an exchange serving the current location area of the subscriber.

7. A telecommunications network according to claim 1, wherein the format of the subscriber numbers of the telecommunications network is as follows:

CC NDC MH EN, in which CC=Country Code, NDC=National Destination Code, MH=number of the exchange serving the access point indicated by a semi-fixed or fixed subscriber number or number of the subscriber data base serving a subscriber having a high mobility, EN=subscriber-specific number.

8. A telecommunications network according to claim 7, wherein the first exchange processing an incoming call in the telecommunications network is arranged to analyze the MH from the called subscriber number, and, if the MH identifies some subscriber data base of the telecommunications network, the first exchange processing the call in the telecommunications network is arranged to make an interrogation to the subscriber data base of the called subscriber, and, if the MH identifies some exchange of the telecommunications network, the exchange is arranged to route the call directly to the exchange identified by the MH.

9. A telecommunications network according to claim 1, wherein the format of a semi-fixed and fixed subscriber number is as follows:

CC NDC PFX M EN, in which CC=Country Code, NDC=National Destination Code, PFX=identifier of semi-fixed and fixed subscriber numbers, M–number of the exchange serving the access point indicated by the semi-fixed or fixed subscriber number, EN=subscriber-specific number.

10. A telecommunications network according to claim 9, wherein:

the first exchange processing an incoming call in the telecommunications network is arranged to detect on the basis of the identifier PFX that the called subscriber number is a semi-fixed or fixed subscriber number, and the first exchange processing the call in the telecommunications network is arranged to route the call on the basis of the exchange number M included in the subscriber number to the exchange serving the access point indicated by the subscriber number, which exchange is arranged to route the call to the called subscriber on the basis of the EN number.

11. A telecommunications network according to claim 7, wherein the format of a semi-fixed and fixed subscriber number is a follows:

CC NDC PFX SS EN, in which CC=Country Code, NDC=National Destination Code, PFX=identifier of the semi-fixed and fixed subscriber number, SS=number of a subsystem connected to the telecommunications network and including the access point indicated by the semi-fixed or fixed subscriber number, EN=subscriber-specific number.

12. A telecommunications network according to claim 11, wherein:

the first exchange processing an incoming call in the telecommunications network is arranged to detect on the basis of the identifier PFX that the subscriber number is semi-fixed or fixed and the first exchange processing the call in the telecommunications network is arranged to route the call on the basis of the SS number to the exchange serving a subsystem of the called subscriber and further to route the call, likewise on the basis of the SS, to the subsystem of the called subscriber, and finally, the subsystem of the called subscriber is arranged to route the call to the called subscriber on the basis of the EN.

13. A telecommunications network according to claim 3, wherein:

the access point indicated by the subscriber number, the exchange and/or the subscriber data base serving the exchange comprises a parameter indicating whether the subscriber is at the access point indicated by its subscriber number.

14. A telecommunications network, comprising:

a plurality of exchanges;

a plurality of subscriber stations, at least some of said subscriber stations being capable of moving in said network;

at least one subscriber data base for maintaining information as to location of said subscribers;

a first set of said subscriber stations being provided with respective subscriber numbers of a first type of subscriber numbers requiring a routing data interrogation to said at least one subscriber data base for routing an incoming call to a respective subscriber station;

a second set of said subscriber stations being provided with respective subscriber numbers of a second type of subscriber numbers directly indicating a respective point of the network to which an incoming call to a respective subscriber station will be routed, without making an interrogation to said at least one subscriber data base;

said exchanges being arranged to analyze the subscriber number related to each incoming call and, on the basis of such analysis, either to route the call directly to the point of the network indicated by the subscriber number when the analyzed subscriber number is of said second type of subscriber number, or to make said routing data interrogation to said at least one data base when said analyzed subscriber number is of said first type of subscriber number.

15. A network according to claim 14, wherein:

only ISDN signalling is arranged to be used between the telecommunications network and a subsystem connected to it, instead of using non-ISDN signalling which is otherwise in use in the telecommunications network.

16. The telecommunications network of claim 14, wherein:

said first set of said subscriber stations is constituted by those subscriber stations of said plurality which are predetermined to be more mobile than are said subscriber stations of said second set.

* * * * *